US006748637B2

(12) United States Patent
Meggiolan

(10) Patent No.: US 6,748,637 B2
(45) Date of Patent: Jun. 15, 2004

(54) TOOL FOR INSERTING AND EXTRACTING PINS OF ROLLER CHAINS

(75) Inventor: Mario Meggiolan, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 10/288,753

(22) Filed: Nov. 6, 2002

(65) Prior Publication Data

US 2003/0084555 A1 May 8, 2003

(30) Foreign Application Priority Data

Nov. 7, 2001 (IT) ..................................... TO2001A1056

(51) Int. Cl.[7] ................................................ B23P 19/04
(52) U.S. Cl. ........................................................ 29/257
(58) Field of Search .......................... 29/257, 251, 270, 29/281.1, 256; 59/7, 8, 35.1

(56) References Cited

U.S. PATENT DOCUMENTS

| | | | | |
|---|---|---|---|---|
| 1,000,867 A | * | 8/1911 | Widmayer et al. | 29/257 |
| 1,469,594 A | * | 10/1923 | Harley | 29/257 |
| 2,895,289 A | * | 7/1959 | Wognum et al. | 59/7 |
| 3,553,960 A | * | 1/1971 | Ellefson | 59/7 |
| 5,140,736 A | * | 8/1992 | Hsiao | 29/243.54 |
| 5,148,590 A | * | 9/1992 | Wu | 29/257 |
| 5,203,158 A | * | 4/1993 | Bowers | 59/7 |
| 5,713,117 A | * | 2/1998 | Bliss | 29/257 |
| 5,787,701 A | * | 8/1998 | Small | 59/7 |

FOREIGN PATENT DOCUMENTS

| | | |
|---|---|---|
| GB | 912703 | 11/1959 |

* cited by examiner

*Primary Examiner*—Robert C. Watson
(74) *Attorney, Agent, or Firm*—Volpe and Koenig, P.C.

(57) ABSTRACT

A tool for inserting and extracting pins of roller chains, comprising a body having a pair of teeth designed to engage two chain links to be connected or separated by insertion or extraction of a pin. The tool comprises a screw member which can be operated manually and which is provided with a punch designed to co-operate with a pin that is to be inserted or extracted. The tool comprises two retaining elements which can move between an inoperative position, in which the chain links can freely engage and disengage the teeth, and an operative position, in which the teeth block the chain links in a pre-set position with respect to the teeth (26).

14 Claims, 2 Drawing Sheets

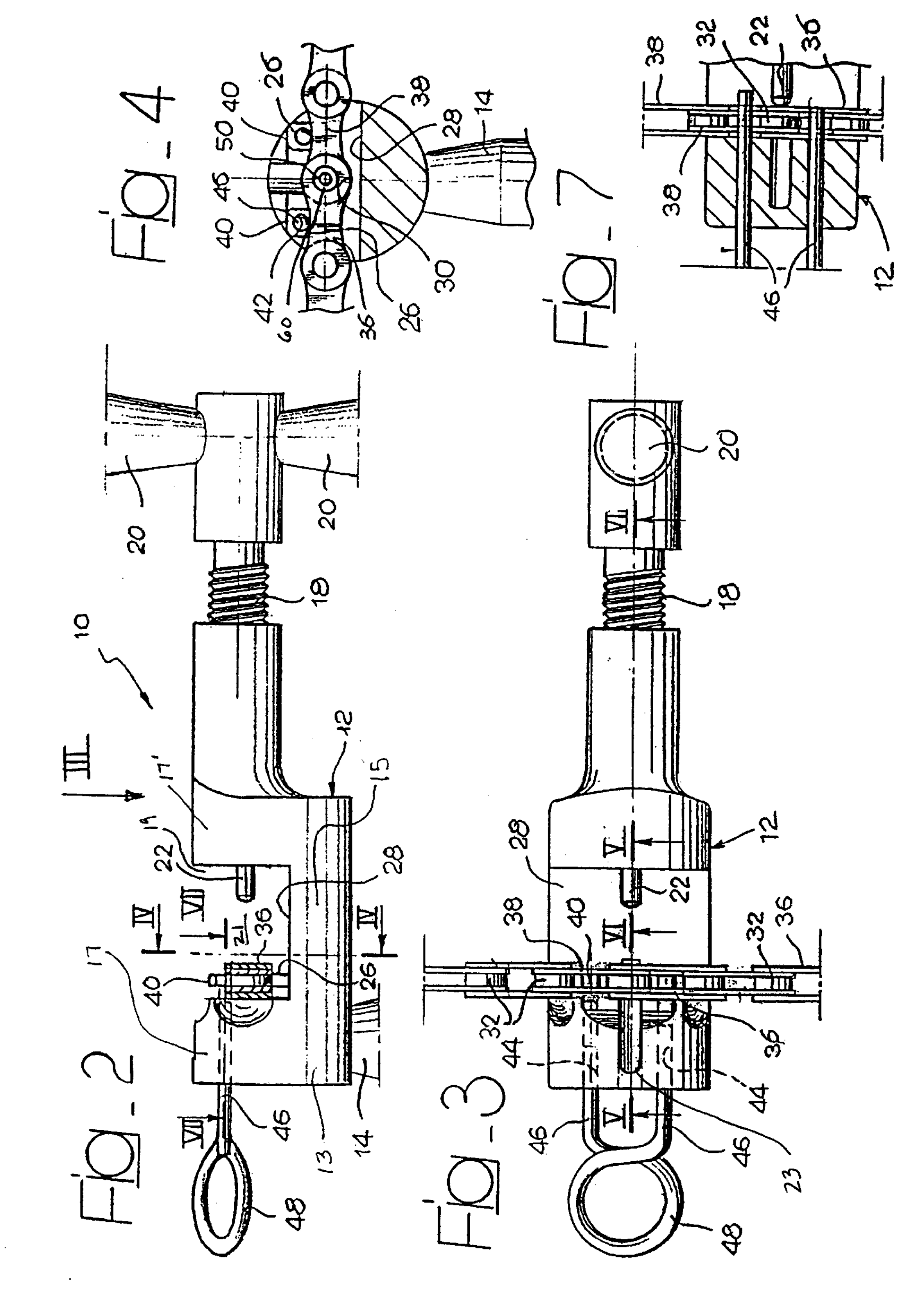

TOOL FOR INSERTING AND EXTRACTING PINS OF ROLLER CHAINS

FIELD OF INVENTION

The present invention relates to a tool for inserting and extracting pins of roller chains.

BACKGROUND

Tools of the above type are generally used for mounting a new chain on a bicycle or for varying the length of the chain, for example in the case in which the rear wheel of the bicycle is replaced with a wheel having a set of sprockets with a different number of teeth.

A chain tool of a known type is described in GB-B-912703. The described tool comprises a body which has a pair of teeth designed to engage the ends of two chain links that are to be connected or separated by inserting or extracting a pin. The body carries a screw member that can be operated manually and is provided with a punch, which, upon rotation of the screw member is forced into contact with one end of a pin that is to be inserted into the chain links engaged in the aforesaid teeth, or to be extracted from the said chain links.

A drawback of the chain tools according to the prior art lies in the fact that the user must manually hold the chain links in engagement with the teeth of the tool. This operation is very inconvenient in so far as the user must hold the tool with one hand, while with the other hand he acts on the screw member, which exerts the necessary pressure for inserting or extracting the pin. At the same time, with the hand that holds the tool, the user must press the chain links downwards, generally using a thumb. This operation proves inconvenient and does not afford any guarantee in terms of correct positioning of the chain links during insertion or extraction of the pin. In the case where insertion or extraction of the pin is carried out while the chain links are not properly positioned, there is the risk of damaging the holes of the links, with the consequent danger of weakening the chain and rendering it subject to failure due to stress.

With a view to overcoming the above-mentioned drawbacks, the subject of the present invention is a tool for removing and inserting a pin in elements of a roller chain.

SUMMARY

A tool for removing and inserting a pin in aligned elements of a roller chain. The tool has a generally "U" shaped body; an element receiver having a base, opposed sides and an opening opposite the base that define a cavity to receive the elements of the roller chain and position them in alignment, with at least one of the opposed sides having defining therein an aperture positioned adjacent to the opening, the element receiver being located on a first branch of the "U"; a movable press punch located on a second branch of the "U" and positioned for powered movement toward the channel defined by the aligned elements; and a locking element that closes the receiver opening to retains the elements of the roller chain in the receiver cavity.

BRIEF DESCRIPTION OF THE DRAWING(S)

The present invention will now be described in detail with reference to the attached drawings, which are provided purely by way of non-limiting example and in which:

FIGS. 2 and 3 are, respectively, a side elevation and a plan view of the tool of FIG. 1;

FIG. 4 is a cross-sectional view according to the line IV—IV of FIG. 2;

FIG. 7 is a cross-sectional view according to the line VI—VI of FIG. 1.

DETAILED DESCRIPTION OF THE PREFERRED EMBODIMENT(S)

Figure 6:
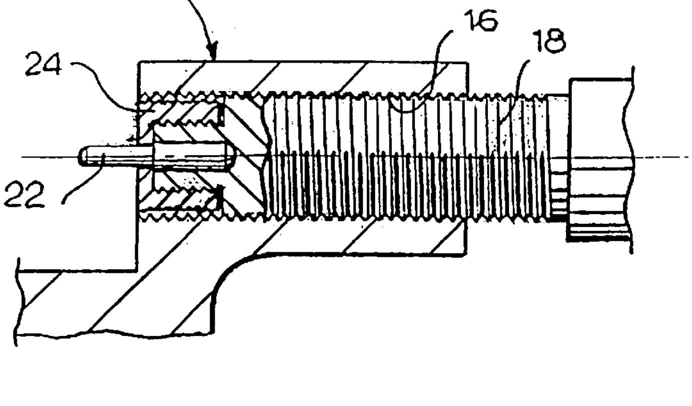
FIG. 6 is a cross-sectional view according to the lines VII—VII of FIG. 3.

With reference to the figures, number 10 designates a tool for inserting and extracting pins of roller chains, in particular for bicycles. The tool 10 comprises a body 12 to which a grip 14 is fixed. The body has an element receiver portion 13 that is the portion of the body 12 generally encompassing the left side of the body 12 (as shown in FIG. 2) and including the cavity 21, as opposed to the cylindrical internally-threaded 16 right side of the body 12. The cavity 21 is formed by a base 15, a left side 17, by a right side 17', and by an upper opening 19 opposite the base 15. Preferably, the left side 17 of the cavity 21 presents an aperture 23 (see FIG. 3) substantially aligned with the punch 22. The body 12 has a threaded hole 16 (FIG. 6) inside which a screw element 18 having a pair of radial arms 20 for manual application of a tightening torque is engaged. The screw element 18 carries a punch 22 which is preferably mounted in such a way that it can freely turn about its own longitudinal axis with respect to the screw element 18. As illustrated in FIG. 6, a cup ring 24 withholds the punch 22 in the axial direction with respect to the screw element 18, at the same time leaving the punch 22 free to turn about its own longitudinal axis.

The body 12 of the tool 10 carries at least two teeth 26 which project from a bottom wall 28. The teeth 26 define between them a seat 30 designed to receive a roller 32 of a chain 34. During use, the two teeth 26 insert inside the two chain links 36, 38 set on opposite sides with respect to the roller 32. In the condition where the chain 34 engages the teeth 26, the distal portions 40 of the teeth 26 project above the respective chain links 36, 38. The distal portions 40 of the teeth 26 are provided with respective through holes 42.

The body 12 of the tool 10 has a pair of holes or apertures 44 aligned to the holes 42 of the teeth 26. Two retaining elements 46 are slidably mounted inside the holes 44 and can move axially inside the holes 44 between an inoperative position, in which they are disengaged, and an operative position, in which they are engaged. In the embodiment illustrated by way of example in the figures, the retaining elements 46 are formed by two parallel branches of a metal wire bent in such a way as to form an eyelet 48. The eyelet 48 can be gripped manually for moving the retaining elements 46 between the inoperative position and the operative position and vice versa. The fact that the retaining elements 46 are formed by a bent wire only represents a preferred embodiment of the invention. The retaining elements 46 can be made in a different way, provided that they can move between an engagement position and a disengagement position with respect to the teeth 26.

Figure 1:
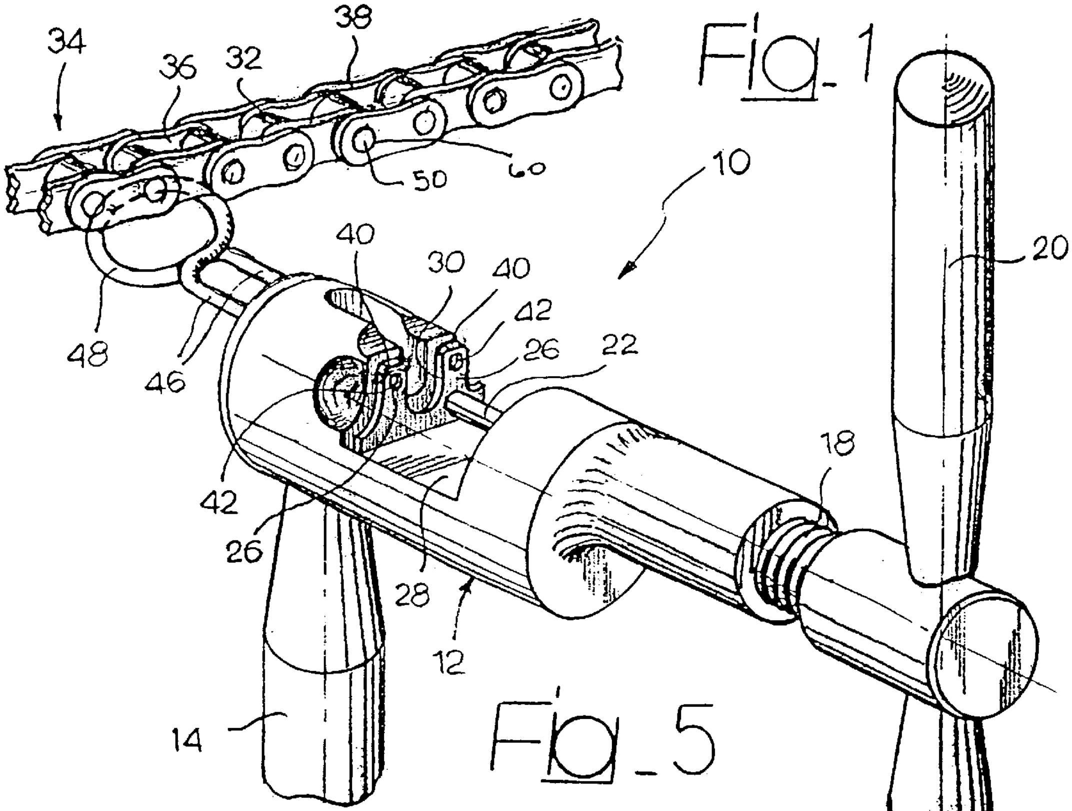
FIG. 1 is a perspective view illustrating a tool according to the present invention.
Figure 5:
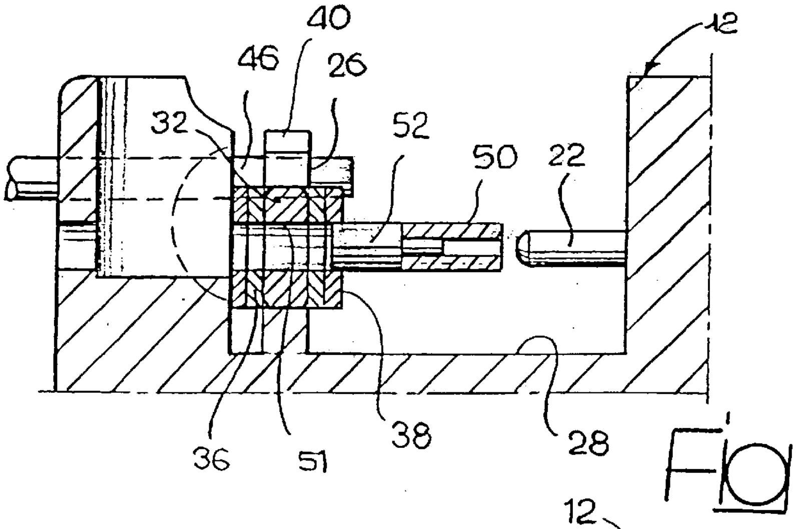
FIG. 5 is a cross-sectional view according to the line V—V of FIG. 3, illustrating the step of insertion of a pin.

In the position of disengagement illustrated in FIGS. 2 and 3, the retaining elements 46 do not interfere with the teeth 26. In this configuration, the chain links 36, 38 can freely engage or disengage the teeth 26. After the chain links have engaged the teeth 26, the retaining elements 46 are brought into their operative clamping position by means of an axial thrust manually applied by the user on the eyelet 48. As may be seen in particular in FIGS. 4 and 7, when the retaining elements 46 are in their operative position, they engage the holes 42 of the teeth 26 and set themselves above the chain links 36, 38. In this position, the retaining elements 46 block the chain links 36, 38 in a pre-set position with respect to the body 12. In the clamping position of the chain 34, the axis of the chain roller 32 housed in the seat 30 is properly aligned with the axis of the punch 22. In this condition, the user can operate the screw element 18 for extracting or inserting a chain pin 50 from/into the aligned holes 60 of the chain links 36, 38, as illustrated in FIG. 5. Insertion of a new pin 50 can preferably be carried out using a guide element 52 that inserts with play into the articulation seat 51, as described in detail in the co-pending U.S. patent application Ser. No. 10/165,147, filed Jun. 7, 2002.

With reference to FIG. 4, it may be noted that the arched shape of the chain links 36, 38 facilitates centring of the links with respect to the teeth 26, since the retaining elements 42 set themselves at the centre of the curved profile of the chain links and tend to centre each link 36, 38 with respect to the corresponding tooth 26.

In the condition in which the chain links engage the teeth 26 and are withheld by the retaining elements 46, the user has both of his hands free for operating the tool 10 and can use one of his hands for holding the tool 10 by its grip 14 and the other hand for operating the screw element 18 by means of the radial arms 20. In particular, the user need not withhold the chain with his thumb, as, instead, it is necessary to do using devices according to the prior art. The chain tool according to the present invention thus facilitates the manoeuvre for insertion or extraction of a chain pin and moreover enables a greater precision of insertion of the pin to be achieved thanks to the fact that the chain is withheld in a precise and repeatable way with respect to the axis of the punch 22. This greater precision in positioning and retaining the chain considerably reduces the risk of damaging the holes of the chain links and the risk of failure due to stress of the chain itself.

What is claimed is:

1. A tool for inserting and extracting pins of roller chains, in particular for bicycles, comprising:

- a body which has at least two teeth designed to engage two chain links that are be connected or separated by inserting or extracting a pin;
- a screw element carried by said body, which can be operated manually and which is provided with a punch, the said punch, upon rotation of the screw element, co-operating with a pin to be inserted into or extracted from chain links engaged in the aforesaid teeth,
- retaining means which are carried by the aforesaid body and can move between an inoperative position, in which the aforesaid chain links can freely engage and disengage the aforesaid teeth, and an operative position, in which they block the aforesaid chain links in a pre-set position with respect to the aforesaid teeth.

2. The tool according to claim 1, characterized in that the aforesaid retaining means comprise a pair of rectilinear retaining elements which can move axially between the operative position and the inoperative position and vice versa.

3. The tool according to claim 2, characterized in that the aforesaid teeth have distal ends which, during use, project beyond the aforesaid chain links, the aforesaid distal ends being provided with respective holes designed to receive in a sliding way respective portions of the aforesaid retaining elements.

4. The tool according to claim 2, characterized in that the aforesaid retaining elements co-operate with arched portions of the aforesaid chain links for centering the aforesaid chain links with respect to the corresponding teeth.

5. The tool according to claim 2, characterized in that the aforesaid retaining elements are formed by two rectilinear branches of a bent metal wire.

6. The tool according to claim 5, characterized in that the aforesaid metal wire forming the retaining elements is bent in such a way as to form an eyelet that can be gripped manually.

7. A tool for removing and inserting a pin in aligned holes defined by aligned elements of a roller chain, the tool comprising:

- a generally "U" shaped body;
- an element receiver having a base, opposed sides and an opening opposite the base that define a cavity to receive the elements of the roller chain and position them in alignment, with at least one of the opposed sides defining therein an aperture positioned adjacent to the opening, the element receiver being located on a first branch of the "U";
- a movable press punch located on a second branch of the "U" and positioned for powered movement toward the aligned holes defined by the aligned elements; and
- a locking element that passes through the aperture in the at least one side of the receiver and closes the receiver opening to retain the elements of the roller chain in the receiver cavity.

8. The tool of claim 7 wherein the receiver cavity is at least two teeth that engage the elements of the roller chain.

9. The tool of claim 7 wherein the locking element is a formed wire.

10. The tool of claim 7 wherein the locking element passes through the aperture.

11. The tool of claim 7 wherein the locking element comprises two elongated wire ends that retain the elements of the roller chain.

12. The tool of claim 11 wherein the locking elements are two branches of a bent metal wire.

13. The tool of claim 12 wherein the bent metal wire includes an eyelet formed by the bend.

14. A tool for inserting and extracting pins into a aligned holes formed by two aligned elements of a roller chain, the tool comprising:

- a elongated body having a generally "U" shaped portion which has at least two teeth adjacent a first branch of the "U" to engage the elements of the roller chain in alignment, the teeth being of sufficient length to extend through the elements of the roller chain and define a locking element receptor;
- a movable press punch located on a second branch of the "U" and positioned for powered movement toward the teeth and in alignment with the aligned holes defined by the aligned elements; and
- a locking element that mates with the locking element receptor and retains the elements of the roller chain on the teeth.

* * * * *

UNITED STATES PATENT AND TRADEMARK OFFICE

CERTIFICATE OF CORRECTION

PATENT NO. : 6,748,637 B2
DATED : July 6, 2004
INVENTOR(S) : Mario Meggiolan

It is certified that error appears in the above-identified patent and that said Letters Patent is hereby corrected as shown below:

Column 3,
Line 45, after "are" delete "be"
Line 51, after "teeth", delete "," and insert therefore -- ; --

Column 4,
Line 48, after "into", delete "a"

Signed and Sealed this

Tenth Day of August, 2004

JON W. DUDAS
*Acting Director of the United States Patent and Trademark Office*